No. 782,954. Patented February 21, 1905.

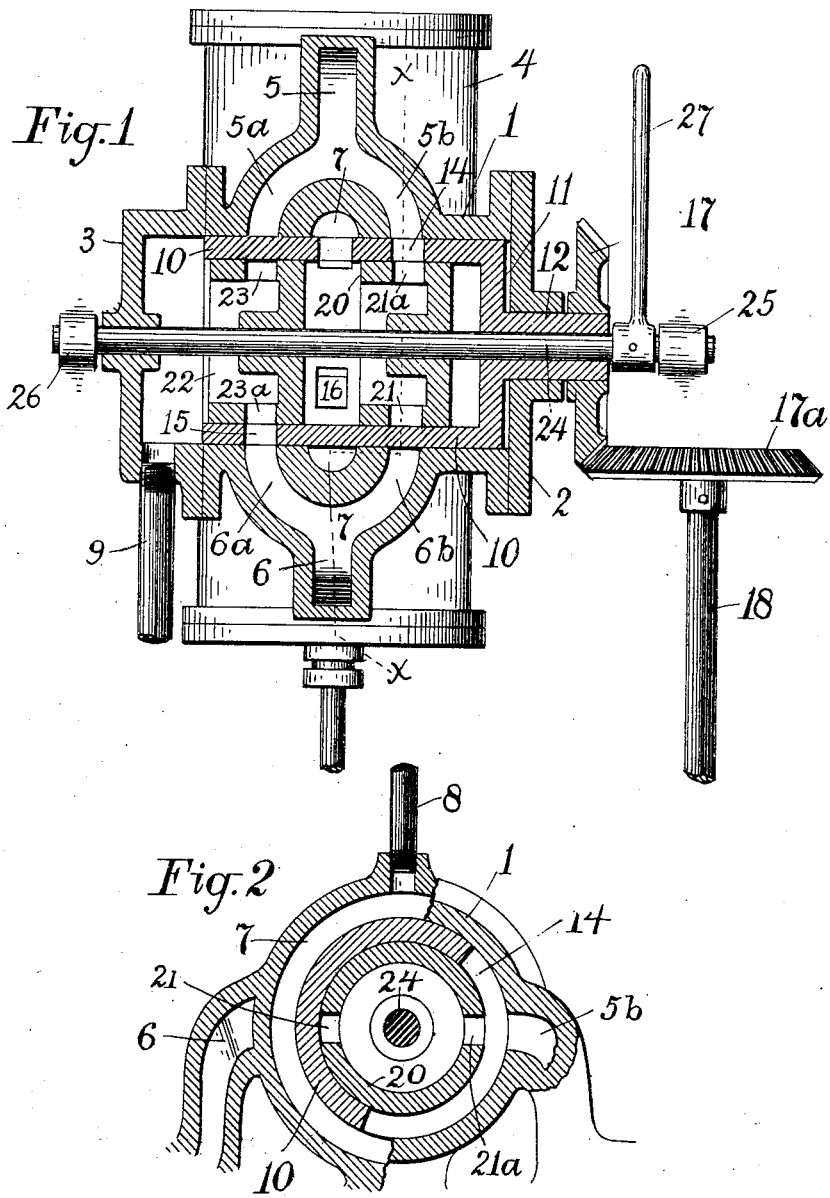

UNITED STATES PATENT OFFICE.

GILBERT R. ELLIOTT, OF BOSTON, MASSACHUSETTS.

ROTARY VALVE.

SPECIFICATION forming part of Letters Patent No. 782,954, dated February 21, 1905.

Application filed June 13, 1903. Serial No. 161,313.

*To all whom it may concern:*

Be it known that I, GILBERT R. ELLIOTT, a subject of the King of Great Britain, and a resident of Boston, in the county of Suffolk, State of Massachusetts, have invented certain new and useful Improvements in Rotary Valves, of which the following is a full, clear, and exact description.

The object of this invention is the construction of certain improvements in the form of rotary valve set forth in my Letters Patent No. 676,179. In my said patent the main inlet-valve rotates within one or more cylindrical shells fitting in the cylindrical casing, these shells being normally stationary, but adjustable angularly for the purpose of reversing the engine and varying the cut-off. My present invention differs therefrom in having the main inlet-valve normally stationary, but having the cut-off shell between it and the casing revolving synchronously with the engine drive-shaft.

Referring to the drawings forming part of this specification, Figure 1 is a longitudinal central section of the valve in a plane parallel with the engine-cylinder, and Fig. 2 is a transverse section of the same on the broken line X X in Fig. 1.

The valve-casing is designated by the reference-numeral 1, while 2 is the right-hand head of said casing and 3 is the left-hand head.

4 is the engine-cylinder, and 5 and 6 the cylinder-ports leading from the valve to the cylinder, said ports opening from the casing in the branches $5^a$ $5^b$ $6^a$ $6^b$. Fitting within said casing is the cut-off shell 10, having a sleeve 12 projecting from the head 11 through suitable bearings in the head 2. Fixed upon the outer end of this sleeve is a bevel-gear 17, meshing with an equal gear $17^a$, fixed upon a shaft 18, receiving power from the drive-shaft and rotating synchronously therewith. Axially through said sleeve and bearings in the head 3 is a supporting-rod 24, whose ends may have additional supports 25 26. Fixed upon this rod is the main inlet-valve comprising the two cup-shaped valve members 20 22, having the ports 21 $21^a$ 23 $23^a$ at diametrically opposite sides thereof and in the same plane with the ports $5^a$ $5^b$ $6^a$ $6^b$. A handle 27 is fixed upon the outer end of the rod 24 for the purpose of angularly shifting the latter and the main inlet-valve carried thereby, and so varying the cut-off.

Through the sleeve or shell 10 are two slots 14 and 15, the slot 14 being in the same transverse plane with the ports 21 $21^a$ and the slot 15 with the ports 23 $23^a$. Each of said slots extends for slightly less than half the periphery of the shell; but they are located opposite to each other, as indicated in Fig. 1.

The live steam is introduced to the space between the two valve members 20 22 by means of the steam-pipe 8 entering the annular groove 7, encircling the shell 10, the steam passing from this groove in the casing 1 in through openings 16, made in said shell, although a single opening 16 is sufficient for the purpose.

The operation of the valve is as follows: The live steam entering the main inlet-valve 20 through the pipe, groove, and openings just described passes out through that one of the two ports 21 $21^a$, which is uncovered by the arrival of the slot 14, brought thereto by the rotation of the shell. As shown in Fig. 1, it is the cylinder-port $5^b$ to which live steam is thus brought. At the same time the slot 15 is brought into correspondence with the cylinder-port $6^a$, thereby permitting any steam within the cylinder to exhaust through the port $23^a$ and thence out through the exhaust-pipe 9. Further rotation of said shell then closes said ports and delivers live steam through the ports 21 and $6^b$ and permits the exhaust to escape from the opposite end of the cylinder through the ports 23 $5^a$ to said escape-pipe.

What I claim as my invention, and for which I desire Letters Patent, is as follows, to wit:

1. In a rotary valve, the combination with the cylindrical casing having the four cylinder-ports, of the rotary shell fitting within said casing and having openings coacting alternately with said ports, means for introducing live steam within said shell and taking exhaust-steam therefrom, and a non-rotating valve fitting within said shell and separating it into two chambers one for the live steam and the other for the exhaust; said valve being formed with openings or ports coacting with those in said shell, substantially as described.

2. In a rotary valve, the combination with the cylindrical casing having the ports and a head with a bearing at its center, of the shell slotted and fitted within said casing and having the sleeve turning in said bearing but projecting out therefrom, means applied to said sleeve for the rotation thereof and the shell connected therewith, a rod axially supported within said shell and normally held from turning, and the two cup-shaped valve members fixed on said rod and having the diametrically opposite ports, said shell having an opening through it for the admission of live steam to the space between said cup-shaped members, substantially as described.

3. In a rotary valve, the combination with the cylindrical casing having the four ports and the annular groove, of the rotary shell having the slots corresponding with said ports and an opening from said annular groove, and the main inlet-valve normally stationary within said shell and receiving live steam from said groove through said opening to the space between the parts of said main inlet-valve, said valve having the ports, substantially as described.

4. In a rotary valve, the combination with the cylindrical casing having the ports and the heads, the rotary cut-off shell having the sleeve turning in bearings in one of said heads, a bevel-gear fixed on the outer end of said sleeve, an equal gear meshing with said bevel-gear and driven synchronously with the engine's drive-shaft, a rod supported in said sleeve and the casing-head opposite thereto, a lever for angularly adjusting said rod, and the stationary main inlet-valve fixed on said rod and fitting within said shell, substantially as described.

In testimony that I claim the foregoing invention I have hereunto set my hand this 12th day of June, 1903.

GILBERT R. ELLIOTT.

Witnesses:
A. B. UPHAM,
W. L. GOODRICH.